May 9, 1933. H. DE B. RICE 1,908,643

CHANNEL FELT AND ITS PROCESS OF MANUFACTURE

Filed Aug. 30, 1928

INVENTOR
Harold D. Rice
BY
Ernest Hopkinson
ATTORNEY

Patented May 9, 1933

1,908,643

UNITED STATES PATENT OFFICE

HAROLD DE BLOIS RICE, OF BRISTOL, RHODE ISLAND, ASSIGNOR, BY MESNE ASSIGNMENTS, TO NEW YORK BELTING & PACKING COMPANY, OF NEW YORK, N. Y., A CORPORATION OF NEW YORK

CHANNEL FELT AND ITS PROCESS OF MANUFACTURE

Application filed August 30, 1928. Serial No. 303,003.

This invention relates to a novel channel felt and process for making the same. Channel felts are commonly employed in the manufacture of automobiles to provide a smooth noiseless guide in which the glass windows of the car may slide.

Heretofore channel felts have comprised a metal form which may be of U-shape cross section, which is lined with felt by cementing the felt thereto. This type of channel felt is very expensive and after the channel felt has been in use, the felt compacts and wears so as to allow the glass, which moves therein, to have a free play which causes it to rattle.

Another type of channel felt which has been in common use is made by extruding rubber and applying a thin layer of felt to the surface of the rubber. The rubber may be extruded in the desired form, such as a continuous strip having a U-shaped cross section. The objection to this type of channel felt is that it is not waterproof, the felt compacts in use so that play is developed with the result that the window supported by the felt develops a rattle, and the layer of felt is so thin that it quickly wears out, thereby exposing the glass to the rubber surface which adheres to the glass and does not provide a frictionless surface for the glass.

It is an object of my invention to provide a novel channel felt which is waterproof, is permanently resilient and thereby maintains contact between the felt and the glass at all times so as to prevent the development of any rattle, is stronger and more durable than the channel felts heretofore produced, is waterproof and less expensive to make them the previous types of channel felt.

My invention also contemplates the provision of a novel process for making my new channel felt.

For a complete understanding of my invention, reference is had to the following detailed description and to the accompanying drawing, in which.

The novel product of my invention consists essentially in a channel felt made of felt or a like material impregnated with rubber deposited from a water dispersion of rubber and if desired compounding ingredients, which impregnated fabric has been formed into a channel shape having its marginal portions inwardly turned to provide re-entrant tongues which are adapted to engage on opposite sides of the glass to be supported thereby.

Figure 1:
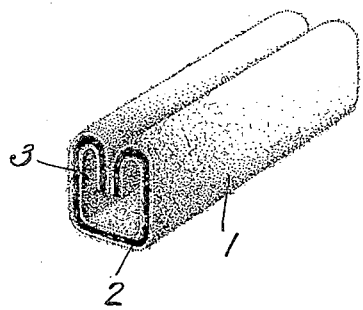
Fig. 1 is a perspective view of one form of my invention.
Figure 3:
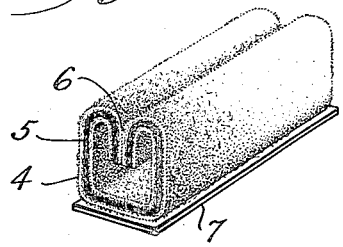
Fig. 3 is a perspective view of a modification of my invention.
Figure 4:
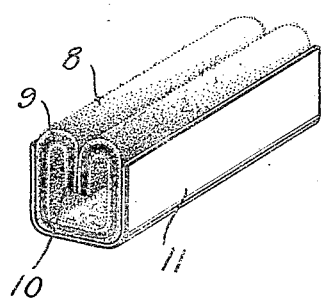
Fig. 4 is a perspective view of a further modification of my invention.
Figure 5:
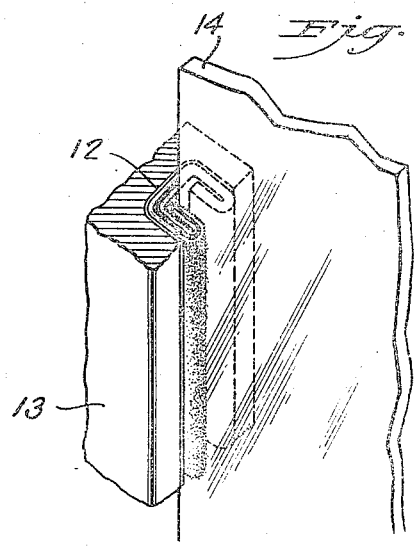
Fig. 5 is a perspective view partly in section showing my invention in use.

In Fig. 1 of the drawing is shown a form of channel felt in which the felt is shown at 1, the impregnating rubber compound is shown at 2, and the inturned marginal portions of the channel are shown as forming eyes at 3. In Fig. 3 of the drawing is shown one form of my channel felt in which the felt 4, impregnating rubber compound 5 and inturned margins 6 are alike in all respects with the corresponding elements of the form shown in Fig. 1; the variation of this type of channel felt over that shown in Fig. 1 being in the reinforcing strip 7 which may be of metal, wood, cardboard, or preferably latex impregnated paper which serves to give support to the back of the channel felt while retaining elasticity. In Fig. 4 of the drawing the felt 8, impregnating rubber compound 9, and inturned margins 10 are like the corresponding elements of the form of my invention shown in Fig. 1, the variation in this modification being the trough-shaped reinforcing element 11 which may be of metal, wood, paper, cardboard or preferably latex impregnated paper which gives the support to the channel felt. In Fig. 5 of my drawing is shown at 12 the modification of my invention which is disclosed in Fig. 4 positioned in a groove of an automobile door 13 and in which slides the glass window 14.

Figure 6:
Fig. 6 is an end elevation of another modification.

In Fig. 6 is shown a channel felt identical with that shown in Fig. 1 except that the reentrant tongues of the channel shown in Fig. 6 are curved so that, normally, they have only one line of contact which reduces the friction between the glass and the felt. The shape of the channel in Fig. 6 is such as to accommodate glass of various thicknesses; an essential requirement inasmuch as glass manufactured according to present day methods for automobile use may vary between 4/32 and 9/32 inch in thickness. Another desirable characteristic of the form of channel felt shown in Fig. 6 is that, probably due to the curvature of the inturned tongues, the tongues will not work out of their normal position to a position extending outwardly of the channel.

As compared with previous channel felts, my channel felt has a greater strength due to the impregnation of the felt with rubber, it has a greater and permanent resiliency because of the impregnated rubber which particularly when vulcanized gives "life" to the channel felt, the inturned marginal or eye portions 3 of the felt which contact with the glass are held against the glass due to the resiliency of the rubber at all times so that any danger of rattling due to the compacting of the felt is eliminated. Another advantage of my invention is that due to the impregnation of the felt with rubber the same is rendered waterproof. A very important feature of my invention is that due to the particular process of impregnating the felt or similar fabric with rubber as hereinafter disclosed, the rubber penetrates the interstices of the fabric but does not remain upon the surface thereof so that an impregnated felt having a thicknap or hair-like surface which is non-adherent to glass is provided. Such a channel felt allows the glass window to slide very freely therethrough and due to the nap-like nature of the surface thereof, the frictionless non-adherent surface does not readily wear away.

In carrying out my novel process for making my novel channel felt, preferably a sheet of the felt as it comes from the usual felting machine is passed into a centrifugal drier of conventional design, to remove surplus moisture. The moist felt is then passed into a water dispersion of rubber and compounding ingredients of which the following composition is an example:

| | Parts by weight |
|---|---|
| Rubber (as water dispersion) | 100 |
| Sulphur | 2 |
| Zinc dimethyl dithiocarbamate | 0.5 |
| Cocoanut oil soap | 0.3 |
| Oil emulsion | 20 |
| Acetaldehyde-aniline condensation product prepared in strong acid solution (emulsion) | 3 |
| Whiting | 20 |
| Glue | 0.75 |
| Nekal | 1 |
| Carbon black | 2 |

The rubber used in the above formula is preferably in the form of latex which has been once creamed by alginating, which reduces the water solubles present, although latex creamed once or more by other creaming agents, normal latex, vulcanized latex, or any other water dispersion of rubber, such as may be obtained by dispersing vulcanized or unvulcanized rubber or reclaim in a mixing mill, such as a Werner-Pfleiderer, may be used. The Nekal of the above formula is a condensation product of an aromatic hydrocarbon with an aliphatic alcohol in the presence of sulphuric acid, which acts as a preservative and to increase the penetrating power of the dispersion. The acetaldehyde-aniline condensation product is an anti-oxidant or age resister, and the zinc dimethyl dithiocarbamate is a low temperature vulcanization accelerator. Low temperature vulcanization is preferred in order to avoid any possible injury to the felt. Other vulcanizing and compounding ingredients may be used in the above formula and coloring materials may be added as desired, also any other suitable material for resisting oxidation and other deterioration may be incorporated. The above dispersion of rubber and compounding ingredients is diluted with water until the total solid content is about 25%. If desired, the vulcanizing or compounding ingredients or both may be omitted, but it is preferred to vulcanize the felt.

Figure 2:
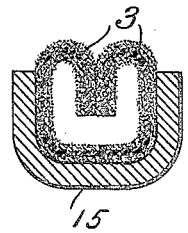
Fig. 2 is a cross sectional view of the channel felt shown in Fig. 1 and a drying and vulcanizing mold or form.

The felt is then drawn from the above bath and passed between squeezing rollers which serve to express the dispersion from the surface of the felt and to remove any excess. The felt as above treated and while still wet is slit and the strips formed are folded by any suitable shaping device so as to give the channel shape with inturned portions 3 as shown in the various figures of the drawing, and the shaped felt is then placed in a mold or form, such as shown at 15 in Fig. 2. It is obvious that if desired the felt may be cut to size before impregnating instead of after. The forms containing the felt are then passed into an oven or other drying means, whereby the moisture is removed from the felt and when vulcanizing ingredients are used a cure is effected.

The dried or dried and vulcanized channel felt when removed from the form or mold 15 has the desired shape, such as shown in Fig. 1, which it retains due to the inherent resiliency of the rubber which impregnates the felt and which greatly increases the strength of the felt. It may then be cut into desired lengths and the back punched or fasteners attached. One of the most important features of the felt obtained by the above described process is that due, probably, to the dilution of the rubber in the dispersion and the step of removing the dispersion from the surface by the squeeze rolls, no visible rubber remains on the surface of the felt. The impregnated felt has a nap or hair-like surface free from rubber which provides a frictionless surface for contact with glass or similar surfaces, such as painted or enameled surfaces but inwardly of the surface of the felt the rubber content increases.

If desired the channel felt may be reinforced, either on the back only, as shown at 7 in Fig. 3, or by a complete channel as shown at 11 in Fig. 4. This reinforcement may be of any suitable material such as metal or paper, and I have found that latex impregnated paper is desirable for this purpose, as it confers stiffness and also elasticity under tension. The paper may be placed in the mold 15, an adhesive such as a latex compound applied to the paper, and the partially or completely formed channel felt run into it and the assembled article dried or dried and vulcanized as before. However, the channel may first be completely finished and then adhesively united to the reinforcements 7 or 11.

By locating the respective pieces of apparatus in proper succession and using conveyors the entire operation may be made a continuous one.

While certain preferred forms of my channel felt, applications thereof, and methods of producing the felt have been disclosed herein, it is not intended to limit the invention thereto inasmuch as they merely exemplify the broad idea of the channel felt which may be made in other forms than those shown, and used in other locations, as will occur to one skilled in the art, and inasmuch as the process for making the same way be varied in its details, the materials entering into the process may be changed within wide limits to suit the particular use for which the felt is to be adapted, all within the scope of my invention.

For an understanding of the scope of my invention, reference should therefore be made to the following claims:

Having thus described my invention, what I claim and desire to protect by Letters Patent is:

1. A device for slidably supporting a closure comprising a channel shaped member of fibrous material having the fibres of its interior portion closely intermingled and intimately associated with rubber but having its external fibres superficially free of rubber, said member having marginal portions extending inwardly of the channel to form tongues adapted to press against opposite sides of the closure.

2. A device for slidably supporting glass or the like comprising a channel shaped member of felt having the fibres of its interior portion closely intermingled and intimately associated with the solids of rubber latex but having its external fibres superficially free of such solids, said member having free marginal portions spaced inwardly from its side walls to form tongues adapted to press against opposite sides of the glass.

3. A device for slidably supporting glass or the like comprising a channel shaped member of fibrous material having its interior impregnated with rubber but its exterior substantially free of rubber, said member having bottom and side portions, the margins of the side portions extending inwardly of the channel to form tongues adapted to press against opposite sides of the glass.

4. A device for slidably supporting glass or the like comprising a channel shaped member of fibrous material having the fibres of its interior portion closely intermingled and intimately associated with vulcanized rubber but having its external fibres superficially free of rubber, the side walls of the channel having internally extending free margins adapted to resiliently and non-frictionally engage the glass.

5. A device for slidably supporting glass or the like comprising a channel shaped member of low temperature vulcanized rubber impregnated felt, the surface of the felt being substantially free of rubber, the side walls of the channel having reentrant free marginal portions adapted to resiliently and non-frictionally engage the glass.

6. A device for slidably supporting glass or the like against vibration comprising fibrous material secured adjacent the glass and having a free edge portion resiliently engaging the glass, said material having the fibres of its interior portion closely intermingled and intimately associated with rubber but having its external fibres superficially free of rubber.

7. A glass runway comprising a laminated strip of rubber and felt, shaped to form the base and sides of a channel, the edges of said strip being return-bent to lie in spaced relation to said sides and terminating adjacent the said base.

8. A new product comprising a ply of felt the internal fibres of which are closely intermingled and intimately associated with rubber, said ply having a nap or hair-like surface substantially free of rubber.

9. A new product comprising a ply of felt the fibres of its interior portion being closely intermingled and intimately associated with rubber derived from an aqueous rubber dispersion, said ply having a nap or hair-like surface substantially free of rubber.

Signed at New York, county of New York, State of New York, this 27th day of August, 1928.

HAROLD DE BLOIS RICE.